May 10, 1949.  E. A. STALKER  2,469,902
AIRCRAFT WINGS HAVING BOUNDARY LAYER CONTROL
Filed June 14, 1943
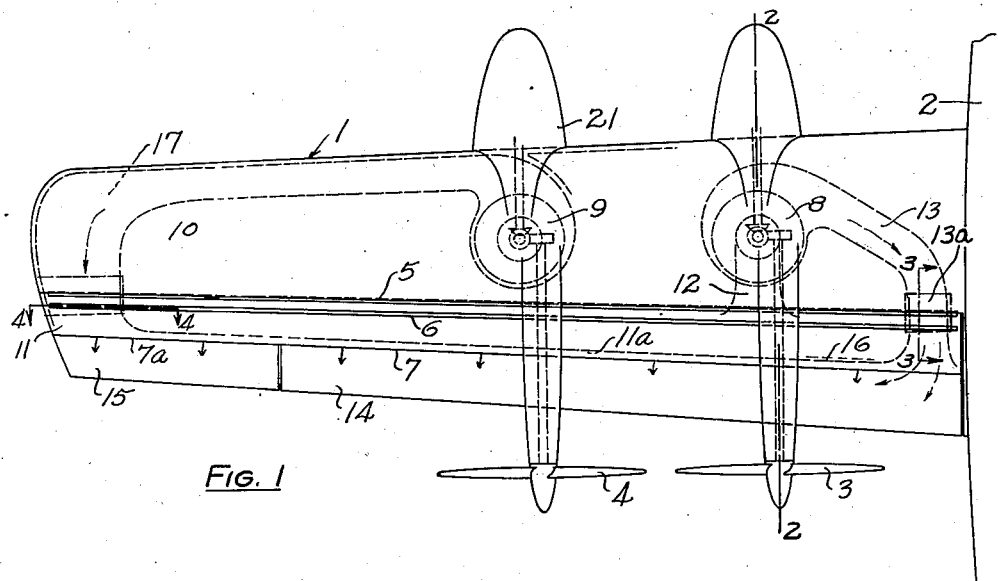
FIG. 1
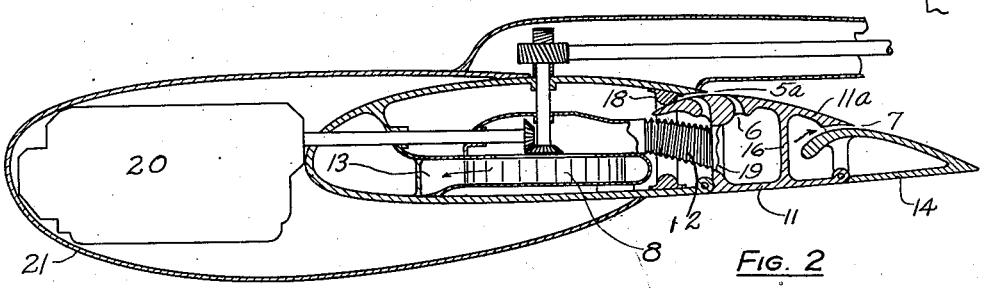
FIG. 2
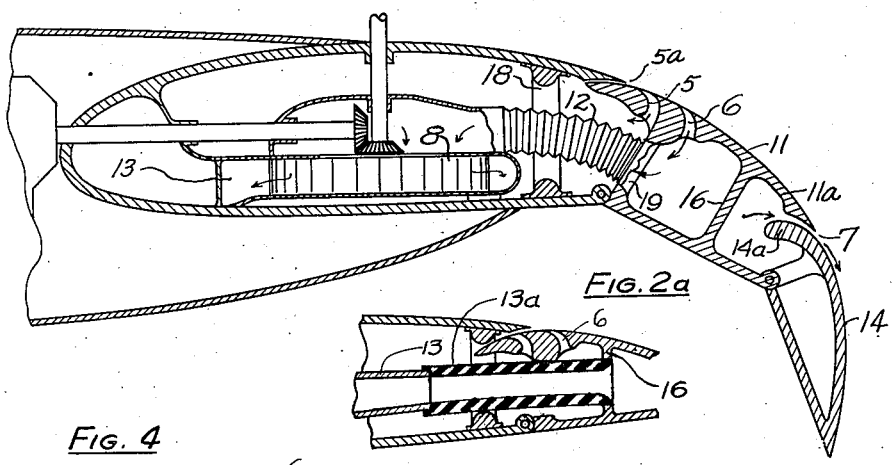
FIG. 2a
FIG. 3
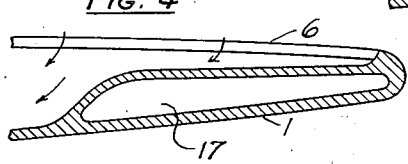
FIG. 4
INVENTOR
Edward A. Stalker
By Marechal & Biebel
ATTORNEYS Patented May 10, 1949

2,469,902

UNITED STATES PATENT OFFICE 2,469,902

AIRCRAFT WINGS HAVING BOUNDARY LAYER CONTROL

Edward A. Stalker, Bay City, Mich.

Application June 14, 1943, Serial No. 490,712

15 Claims. (Cl. 244—42)

My invention relates to aircraft and more particularly to wings therefor.

It has for its object first to provide a wing with an arrangement of slots for boundary layer control which give improved wing performance at high speed and high lift coefficients at low speeds; second to provide a wing having an aileron with an effective means of supplying the aileron with an adequate amount of air for boundary layer control purposes; and third to provide such a wing having an arrangement of slots and compartments which minimizes the effect of failure or damage of any particular part of element on the performance of the boundary layer control function. Other objects will appear from the description and drawings.

I attain the above objects by the means illustrated in the accompanying drawings in which—

Fig. 1 is a fragmentary plan view of an aircraft incorporating the present invention;

Fig. 2 is a section along the line 2—2 in Fig. 1;

Fig. 2a is the same section as Fig. 2 but with the flaps down;

Fig. 3 is a fragmentary section taken along line 3—3 in Fig. 1; and

Fig. 4 is a fragmentary section taken along line 4—4 in Fig. 1.

When air is inducted through an induction slot by a blower, the moving air on the discharge side of the blower contains a considerable amount of energy because of its discharge velocity. It is important and economical to recover this energy or employ it to produce a useful effect. The air can, for instance, conveniently be discharged from a slot extending along the leading edge where it will contribute something to the lift. This is convenient because it is easy to relate a slot, so positioned, to the blower. That is, it is relatively easy to provide the duct communicating between a slot so located and the blower.

A discharge slot, however, is not desirable when the airplane is to travel at high speed with the flaps up, particularly if the jet passes along a large extent of wing area. To insure an even distribution of velocity along the slot and to insure that at no point is the jet of a lower velocity than the local relative wind, it is necessary that the jet have some excess velocity over the local relative wind. This additional velocity means directly added drag because of the greater rubbing speed on the wing surface. This practical difficulty appears not to have been heretofore recognized. It apparently has not been recognized either that if the suction slots are properly located, a discharge slot in the forward half of the wing fails to materially improve the maximum lift realizable from the wing and that in effect therefore it may advantageously be replaced by a properly located suction slot.

On the other hand, a discharge slot aft of a properly located suction slot and in the rear small fraction of the wing will rub on a small area and, what is more important, do this where the relative flow is actually more turbulent than the flow composing the jet so that the drag is not significantly increased by the jet, if increased at all. It is, however, difficult to get the discharge flow past the suction slot or slots to the discharge slot especially where flaps are used.

The discharge slot is desirable as a means of getting rid of the inducted air and as a means of preventing separation of the flow on the rear part of the wing where it will normally begin as the angle of attack of the wing (with flaps down) is increased. The discharged jet is also desirable for developing a lateral control force as described in copending application Serial No. 486,953 filed May 14, 1943, now Patent No. 2,406,923.

While a suction slot can influence the flow ahead of it, a discharge slot can influence the flow only rearward thereof. Hence if a suction slot is located properly it can perform the function of a discharge slot in the wing nose as well as serving the locality near the middle of the wing chord. Experiment in fact shows that to secure satisfactory results a suction slot need not be located ahead of 60% of the chord length from the nose and may be located as far rearward as 80% of the chord length.

Where two suction slots are located in a predetermined relation to each other, the failure of one slot, as a result of damage to its associated blower or other necessary parts, may be largely if not entirely compensated for by the other. In order for one suction slot to assume the function of another the two must be in close proximity to each other in the neighborhood of the locality between 60 and 80 of the chord length back from the nose of the section considered. A suction slot in the forward 25% of the chord and another one in the rear half of the wing would not be interchangeable. In fact, in the absence of the function of the rear slot where so spaced from the forward slot, the forward slot may actually precipitate burbling of the flow by sucking forward on the flow.

The air can be discharged with advantage over the upper side of the aileron so as to get a jet reaction upward. This is important on the down aileron wing because if the relative flow is already being directed vertically downward, rotating the aileron further will not cause a greater downflow. In other words, under these conditions the aileron is largely ineffective to vary the lift on the wing. An additional lift for control is, however, available from an increased flow through the aileron slot, due to the mass reaction of the discharged jet as distinguished from any increase in lift on the wing.

Furthermore in a military airplane it is desirable that the lift for any one wing be furnished by more than one slot, by more than one engine and by more than one blower so that in the case of damage to any one of these elements the airplane is still provided with a large proportion of its original lift and may be properly controlled.

The conflicting requirements of the discharge and suction slot locations set forth above are resolved by the slot arrangements disclosed in the drawings where the wing is shown at 1, and the fuselage at 2. The propellers 3 and 4 are shown as located in the wing at the same side of the fuselage and arranged as pushers.

The wing has the induction slots 5 and 6 which are located in the rear half of the wing and relatively close to each other, both slots extending spanwise over the major portion of and preferably over substantially the entire span of the wing. Rearwardly thereof there is positioned discharge slot 7, and outwardly and forming a continuation thereof a further discharge slot 7a is located.

The engines 20 are located in the nacelles 21 and drive the respective propeller shafts through suitable transmission mechanism. Separate blowers 8 and 9 are provided within the wing interior, each blower being located in substantial alignment with an engine, nacelle and propeller shaft. Each blower is connected to be driven from its respective engine, preferably through an over-running clutch in the manner described in my U. S. Patent No. 1,913,644 dated June 13, 1933. Thus if one engine stops for any reason its propeller acting as a windmill will drive the associated blower and thus both blowers may be kept in operation.

The wing is indicated as comprising a hollow main body portion 10 to the trailing end of which is adjustably secured the flap element 11 which is provided with the induction slots 5 and 6 therein. In the fully depressed high lift position of the flap, these slots are fully exposed and open as shown in Fig. 2a, while in the raised high speed position shown in Fig. 2 slot 5 may be arranged to be closed by moving under the trailing end of the wing main body, leaving slot 6 still open. A slot 5a may if desired be formed between the relatively movable parts of the flap and wing main body.

A second flap 14 is arranged in tandem with flap 11 and may also be adjustable therewith and with respect to the main body 10 as shown. A partition 16 is formed in flap 11 which segregates the interior thereof into a forward induction chamber in direct communication with the induction slots 6, and into a rearward discharge chamber which communicates with the hollow interior of the flap element 14. The flap 14 is formed with a curved forward part 14a which is spaced from the trailing end 11a of flap 11 to form the discharge slot 7. Outwardly of the flap 14 is the aileron 15 which is similarly constructed and related to form discharge slot 7a.

The blowers 8 and 9 draw the air inward through the induction slots 6 and 5 respectively and discharge the air through the discharge slots 7 and 7a. Tracing the flow through blower 8 located in the wing main body 10 it will be observed that its suction side is in closed communication with the interior of the flap 11 by way of the flexible duct 12 fixed to the forward wall thereof. The flexibility permits the flap to be displaced downward as shown in Fig. 2a. Air is drawn into the blower through the slot 6 which is thus segregated from slots 5 and 5a by reason of the imperforate partition or spar 19, and is discharged through the duct 13 and flexible duct 13a into the space to the rear of wall 16 which is open across its span to supply the interiors of flap 14 and also the aileron 15. It will be observed from Fig. 2 that the rear wall 16 is spaced forward and away from the nose of the flap so that air can flow spanwise to both slots 7 and 7a.

The blower 9 is also located in the main body 10 of the wing and spaced spanwise from blower 8. It draws air into the wing through the slots 5 and 5a when the flap 11 is down or through 5 with the flap up and discharges it through the duct 17 which leads along the nose and outwardly to the tip end of the wing and into the aileron 15. Communication into the aileron is preferably provided through the use of a flexible connection similar to that shown at 13a. Thus the flow is delivered to the chamber which supplies slot 7a, and because of the spanwise communication, also adds to the flow out slot 7.

The spars 18 and 19 are of substantial construction and together with heavy plating for strength in this region provide a great amount of protection against shells for the slots and blowers which are concentrated in this region. On the forward side the engine affords protection. This is an important feature.

It should now be clear that I have provided a structure which solves the difficult problem of providing a discharge slot aft of the suction slot and also the problem of reducing the hazard of shell hits. If, for instance, either of slots 5 or 6 is put out of operation the lift is preserved because these slots are sufficiently close together to assume each other's function. Furthermore I have provided for lateral control jets for the aileron from either blower.

Furthermore I provide for the driving of the blowers by either the engine or the rear propeller acting as a windmill. Together with the slot arrangement this confers upon the wing great versatility as regards its ability to maintain lift and lateral control.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, a hollow wing main body and a flap supported in variable relation to form a wing, said wing having an induction slot in the upper surface aft of the midpoint of the wing chord and near the junction of the said body and flap, said wing having a discharge slot in the upper surface of said flap aft of said induction slot, a partition in said wing segregating the space forwardly thereof into an induction chamber in communication with said induction slot and the space rearwardly thereof into a discharge chamber in communication with said discharge slot, blower means located within said wing forwardly of said induction slot, means establishing communication between the inlet of said blower means and said induction chamber, means establishing communication between the discharge of said blower means and said discharge chamber, and means for maintaining communication between said discharge chamber and said discharge slot throughout the variable positioning of said flap.

2. In combination in an aircraft, a hollow wing having a plurality of separate compartments therewith and a plurality of induction slots each in communication with a different said compartment, a plurality of blowers operable independently of each other and each having its inlet in communication with a separate compartment to induce a flow thereinto through the corresponding one of said slots, said induction slots being situated in the rear one-half of the wing so that one slot can assume the boundary layer control function of the other in case the function of one is impaired, said wing also having a discharge slot located aft of said induction slots, and means for delivering the discharge of a said blower to said discharge slot.

3. In combination in an aircraft, a hollow wing having a plurality of separate compartments therewithin and a plurality of induction slots each in communication with a different said compartment, a plurality of blowers each having its inlet in communication with a separate compartment to induce a flow thereinto through the corresponding one of said slots, said induction slots being situated in the rear one-half of the wing so that one slot can assume the boundary layer control function of the other in case the function of one is impaired, said wing having a spanwise partition dividing the interior thereof into a forward induction chamber and a rearward discharge chamber, a discharge slot located aft of said induction slots and in communication with said discharge chamber, and means for delivering the discharge from both said blowers at spaced points into said discharge chamber for common discharge from said discharge slot.

4. In combination in an aircraft, a hollow wing having a plurality of separate compartments therewithin one of which is a discharge compartment, a plurality of slots each in communication with a different said compartment, a plurality of prime movers, a blower for each prime mover operably connected thereto to be driven thereby, each said blower having its inlet in communication with a separate compartment to induce a flow thereinto through a said slot, said induction slots being situated in the rear one-half of the wing so that one slot can assume the boundary layer control function of the other in case the function of one is impaired, a said blower having a discharge duct passing chordwise at one end of the wing to said discharge compartment, and another said blower having a discharge duct passing chordwise at the other end of the wing to said discharge compartment for delivery of a flow of air out of said discharge slot.

5. In combination, a wing main body and a flap supported in variable relation therewith to form a wing, said flap having an induction slot substantially adjacent said main body and a second induction slot in proximity thereto in said flap, means in said wing forming separate induction chambers communicating respectively with said slots, blower means within said wing for inducing flows through said induction slots and said respective chambers, and means for maintaining communication between said blower means and said flap slots when said flap is adjusted to its lowered position.

6. In combination, a wing main body and a flap supported in variable relation therewith to form a wing, said wing having an induction slot substantially adjacent said main body and a second induction slot in proximity thereto in said flap, means in said wing forming separate induction chambers communicating respectively with said slots, a plurality of separate blowers within said wing for inducing separate flows through said induction slots and said respective chambers, and means for maintaining communication between one of said blower means and said flap slot when said flap is adjusted to its lowered position.

7. In combination, a wing main body and a flap supported in variable relation therewith to form a wing, said wing having an induction slot substantially adjacent said main body and a second induction slot in proximity thereto in said flap, said wing also having a discharge slot located aft of said second induction slot, means in said wing forming separate chambers communicating respectively with said slots, blower means within said wing for inducing flows through said induction slots and said respective chambers, means for maintaining communcation between said blower means and said flap slot when said flap is adjusted to its lowered position, and means for supplying the discharge from said blower means to said discharge slot for discharge therefrom.

8. In combination in an aircraft, a wing main body, a control flap supported in variable relation along the outer portion of said main body to form a wing, a plurality of blowers located within said wing, an independent prime mover for driving each of said blowers, said blowers each discharging a flow of air, means defining a compartment within said wing, said wing having a slot in its upper surface leading out of said compartment along said outer portion to direct a jet of air rearwardly of said wing, and separate means of communication between the discharge of each of said blowers and the interior of said compartment in spanwise spaced relation to each other assuring the maintenance of said flow of air in the event of failure of one of said blowers.

9. In combination a hollow wing having a plurality of separate compartments therewithin and a plurality of induction slots each located on its upper airfoil surface and in communication with a different said compartment, a plurality of blowers each operable independently of each other and located within said wing each in communication with a separate said compartment to separately induct the boundary layer through its associated slot into the wing, said induction slots lying in the rear half of the wing between approximately the 60% and the 80% points of the chord and relatively adjacent each other chordwise so that either slot and its associated blower can provide effective boundary layer control upon said wing surface even though the other said slot and blower are inoperative.

10. In combination, a hollow wing main body and a flap supported in variable relation to form a wing, said wing having an induction slot in the upper surface aft of the midpoint of the wing chord and near the junction of said body and flap, said flaps having a discharge slot in its upper surface aft of said induction slot, a partition in said wing segregating the space forwardly thereof into an induction chamber in communication with said induction slot and the space rearwardly thereof into a discharge chamber, blower means located within said wing and having an inlet and a discharge, means establishing communication between the inlet of said blower means and said induction slot through said induction chamber, and additional means laterally spaced from said communication means for establishing and maintaining communication between the discharge of said blower means and said discharge slot throughout the variable positioning of said flap.

11. In combination, a hollow wing main body and a flap supported in variable relation to form a wing, said wing having an induction slot in the upper surface of said flap near the junction of said body and flap, said flap having a discharge slot in its upper surface aft of said induction slot, a partition in said flap segregating the space forwardly thereof into an induction chamber in communication with said induction slot and the space rearwardly thereof into a discharge chamber in communication with said discharge slot, blower means located within said wing main body and having an inlet and a discharge, means establishing communication between the inlet of said blower means and said induction chamber including a flexible element for delivering the air flow continuously through the adjustable relations of said main body and flap, and additional means establishing communication between the discharge of said blower means and said discharge chamber.

12. In combination, a hollow wing main body and a flap supported in variable relation to form a wing, said wing having an induction slot in the upper surface of said flap near the junction of said body and flap, said flap having a discharge slot in its upper surface aft of said induction slot, both said slots being located in the rear half of the wing, a partition in said flap segregating the space forwardly thereof into an induction chamber in communication with said induction slot and the space rearwardly thereof into a discharge chamber in communication with said discharge slot, blower means located within said wing main body and having an inlet and a discharge, means establishing communication between the inlet of said blower means and said induction chamber, additional means establishing communication between the discharge of said blower means and said discharge chamber and flexible means for delivering the air flows continuously between said respective chambers and slots throughout the adjustable relations of said wing main body and said flap.

13. In combination in an aircraft, a hollow wing having a plurality of separate compartments therewithin and a plurality of induction slots each in communication with a different said compartment, a plurality of prime movers, a blower for each prime mover operably connected thereto to be driven thereby, separate means establishing communication between each said blower and a separate said compartment to induce a flow thereinto through the corresponding one of said slots and operable independently of each other, said induction slots being situated in chordwise proximity to each other in the rear one-half of the wing so that one slot and its associated blower can afford effective boundary layer control upon said wing surface even though the functioning of the other said slot and blower is impaired.

14. In combination in an aircraft, a hollow wing having a plurality of separate compartments therewithin and a plurality of induction slots each in communication with a different said compartment, a plurality of separate blowers each having its inlet in communication with a separate compartment and operable independently of each other to induce a flow thereinto through the corresponding one of said slots, said induction slots being situated in chordwise proximity to each other in the rear one-half of the wing so that one slot and its associated blower can afford effective boundary layer control upon said wing surface even though the functioning of the other said slot and blower is impaired.

15. In combination in an aircraft, a hollow wing formed to provide two slots on the surface thereof and in relatively close chordwise proximity to each other, means forming two compartments each in communication with one of said slots and separate from each other, two separate blowers, means establishing separate communication between each said blower and a corresponding one of said compartments to provide for a normal flow of air through one said blower, compartment and the corresponding one of said slots independently of the flow through the other said blower, compartment and slot to control the boundary layer on the surface of said wing under the combined action of said slots, said slots being located in the rear one-half of the wing so that one of said slots and its associated blower can afford effective boundary layer control upon said wing surface even though the functioning of the other said slot and blower is impaired.

EDWARD A. STALKER.

REFERENCES CITED

The following references are of record in the file of this patent:

UNITED STATES PATENTS

| Number | Name | Date |
|---|---|---|
| 2,041,786 | Stalker | May 26, 1936 |
| 2,041,795 | Stalker | May 26, 1936 |
| 2,078,854 | Jones | Apr. 27, 1937 |

FOREIGN PATENTS

| Number | Country | Date |
|---|---|---|
| 209,435 | Great Britain | Nov. 27, 1924 |
| 326,644 | Great Britain | Mar. 20, 1930 |
| 504,747 | Great Britain | May 1, 1939 |
| 539,614 | Germany | Nov. 28, 1931 |
| 547,589 | France | Sept. 27, 1922 |
| 575,581 | France | Apr. 24, 1924 |